(12) United States Patent
Kim

(10) Patent No.: US 8,572,667 B2
(45) Date of Patent: Oct. 29, 2013

(54) HOST DEVICE INTERFACING WITH A POINT OF DEPLOYMENT (POD) AND A METHOD OF PROCESSING DIGITAL VIDEO RECORDER (DVR) STATUS INFORMATION

(75) Inventor: In Moon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 998 days.

(21) Appl. No.: 12/232,533

(22) Filed: Sep. 18, 2008

(65) Prior Publication Data
US 2009/0080867 A1 Mar. 26, 2009

(30) Foreign Application Priority Data
Sep. 20, 2007 (KR) .................. 10-2007-0095716

(51) Int. Cl.
*H04N 7/173* (2011.01)
(52) U.S. Cl.
USPC ............... 725/131; 725/100; 725/107
(58) Field of Classification Search
USPC ............... 386/200; 725/100, 107, 131
See application file for complete search history.

(56) References Cited

U.S. PATENT DOCUMENTS

| | | | |
|---|---|---|---|
| 7,336,785 B1 * | 2/2008 | Lu et al. ................ | 380/201 |
| 2003/0078891 A1 * | 4/2003 | Capitant ................ | 705/57 |
| 2003/0084440 A1 * | 5/2003 | Lownes ................ | 725/6 |
| 2006/0140576 A1 * | 6/2006 | Oka ................ | 386/46 |
| 2006/0168631 A1 * | 7/2006 | Nishikawa et al. .......... | 725/89 |
| 2006/0236355 A1 * | 10/2006 | Kim et al. ................ | 725/100 |
| 2007/0050836 A1 * | 3/2007 | Stanek et al. ............ | 725/131 |
| 2007/0101395 A1 * | 5/2007 | Cha ................ | 725/134 |
| 2008/0168513 A1 * | 7/2008 | Cha ................ | 725/107 |
| 2009/0083540 A1 * | 3/2009 | Kim ................ | 713/156 |

FOREIGN PATENT DOCUMENTS

| | | |
|---|---|---|
| CN | 1744692 | 3/2006 |
| EP | 1246463 A2 | 10/2002 |
| EP | 1784019 A2 | 5/2007 |

OTHER PUBLICATIONS

"OpenCable Specifications Host 2.0 DVR Extension OC-SP-HOST 2-DVREXT-101-050502" Internet Citation, [Online], Feb. 5, 2005, pp. 1-15, XP007907783, Retrieved from the Internet: URL:http://www.cablelabs.com/specifications/archieves/OC-SP-Host2-DVREXT-101-050502.pdff> [retrieved on Mar. 19, 2009].
"OpenCable Host Device 2.0 Core Functional Requirements", 20070615, No. OC-SP-HOST2.0-CFR-I14-070615, Jun. 15, 2007, XP002517005, pp. 17, 72-75, 91-95.
"OpenCable Specifications CableCARD Interface 2.0 Specification OC-SP-CCIF2.0-III-070615", Internet Citation, [Online], Jan. 1, 2004, ,XP007907784, Retrieved from the Internet: URL:http://www.cablelabs.com/specifications/archives/OC-SP-CCIF2.0-I11-070615.pdf> [retrieved on Mar. 19, 2009], pp. 13-20, 132-134, 156.

* cited by examiner

*Primary Examiner* — Peter Shaw
*Assistant Examiner* — Dao Ho
(74) *Attorney, Agent, or Firm* — McKenna Long & Aldridge LLP

(57) ABSTRACT

A host device interfacing with a point of deployment (POD) and a method of processing digital video recorder (DVR) status information are disclosed. A storage device records contents. A communication unit transmits/receives data over a network. A controller collects information associated with the storage of the contents, updates DVR status information on the basis of the collected information, and transmits the updated DVR status information via the communication unit when a request for the DVR status information is received.

6 Claims, 13 Drawing Sheets

FIG. 4A

| OC-STB-HOST-MIB | | |
|---|---|---|
| ocStbHostHWIdentifiers | | |
| Object | OCHD2 | Access |
| ocStbHostSerialNumber | M | RO |
| ocStbHostHostID | M | RO |
| ocStbHostCapabilities | M | RO |
| | | |
| ocStbHostAVInterfaceTable | | |
| Object | OCHD2 | Access |
| ocStbHostAVInterfaceIndex | M | N-Acc |
| ocStbHostAVInterfaceType | M | RO |
| ocStbHostAVInterfaceDesc | M | RO |
| ocStbHostAVInterfaceStatus | M | RO |
| | | |
| ocStbHostIEEE1394Table | | |
| Object | OCHD2 | Access |
| ocStbHostIEEE1394ActiveNodes | M | RO |
| ocStbHostIEEE1394DataXMission | M | RO |
| ocStbHostIEEE1394DTCPStatus | M | RO |
| ocStbHostIEEE1394LoopStatus | M | RO |
| ocStbHostIEEE1394RootStatus | M | RO |
| ocStbHostIEEE1394CycleIsMaster | M | RO |
| ocStbHostIEEE1394IRMStatus | M | RO |
| ocStbHostIEEE1394AudioMuteStatus | M | RO |
| ocStbHostIEEE1394VideoMuteStatus | M | RO |

FIG. 4B

| ocStbHostIEEE1394ConnectedDevicesTable | | |
|---|---|---|
| Object | OCHD2 | Access |
| ocStbHostIEEE1394ConnectedDevicesIndex | M | N-Acc |
| ocStbHostIEEE1394ConnectedDevicesAVInterfaceIndex | M | RO |
| ocStbHostIEEE1394ConnectedDevicesSubUnitType | M | RO |
| ocStbHostIEEE1394ConnectedDevicesEui64 | M | RO |
| ocStbHostIEEE1394ConnectedDevicesADSourceSelectSupport | M | RO |
| | | |
| ocStbHostDVIHDMITable | | |
| Object | OCHD2 | Access |
| ocStbHostDVIHDMIOutputType | M | RO |
| ocStbHostDVIHDMIConnectionStatus | M | RO |
| ocStbHostDVIHDMIRepeaterStatus | M | RO |
| ocStbHostDVIHDMIVideoXmissionStatus | M | RO |
| ocStbHostDVIHDMIHDCPStatus | M | RO |
| ocStbHostDVIHDMIVideoMuteStatus | M | RO |
| ocStbHostDVIHDMIOutputFormat | M | RO |
| ocStbHostDVIHDMIAspectRatio | M | RO |
| ocStbHostDVIHDMIAudioFormat | M | RO |
| ocStbHostDVIHDMIAudioSampleRate | M | RO |
| ocStbHostDVIHDMAudioChannelCount | M | RO |
| ocStbHostDVIHDMIAudioMuteStatus | M | RO |
| | | |
| ocStbHostComponentVideoTable | | |
| Object | OCHD2 | Access |
| ocStbHostComponentVideoConstrainedStatus | M | RO |
| ocStbHostComponentOutputFormat | M | RO |
| ocStbHostComponentAspectRatio | M | RO |
| ocStbHostComponentVideoMuteStatus | M | RO |

FIG. 4C

| ocStbHostRFChannelOutTable | | |
|---|---|---|
| Object | OCHD2 | Access |
| ocStbHostRFChannelOut | M | RO |
| ocStbHostRFChannelOutAudioMuteStatus | M | RO |
| ocStbHostRFChannelOutVideoMuteStatus | M | RO |
| | | |
| ocStbHostInBandTunerTable | | |
| Object | OCHD2 | Access |
| ocStbHostInBandTunerModulationMode | M | RO |
| ocStbHostInBandTunerFrequency | M | RO |
| ocStbHostInBandTunerInterleaver | M | RO |
| ocStbHostInBandTunerPower | M | RO |
| ocStbHostInBandTunerAGCValue | M | RO |
| ocStbHostInBandTunerSNRValue | M | RO |
| ocStbHostInBandTunerUnerroreds | M | RO |
| ocStbHostInBandTunerCorrecteds | M | RO |
| ocStbHostInBandTunerUncorrectables | M | RO |
| ocStbHostInBandTunerCarrierLockLost | M | RO |
| ocStbHostInBandTunerPCRErrors | M | RO |
| ocStbHostInBandTunerPTSErrors | M | RO |
| | | |
| ocStbHostProgramStatusTable | | |
| Object | OCHD2 | Access |
| | | |
| ocStbHostProgramIndex | M | N-Acc |
| ocStbHostProgramAVSource | M | RO |
| ocStbHostProgramAVDestination | M | RO |
| ocStbHostProgramContentSource | M | RO |
| ocStbHostProgramContentDestination | M | RO |

FIG. 4D

| ocStbHostMpeg2ContentTable | | |
|---|---|---|
| Object | OCHD2 | Access |
| ocStbHostMpeg2ContentIndex | M | N-Acc |
| ocStbHostMpeg2ContentProgramNumber | M | RO |
| ocStbHostMpeg2ContentTransportStreamID | M | RO |
| ocStbHostMpeg2ContentTotalStreams | M | RO |
| ocStbHostMpeg2ContentSelectedVideoPID | M | RO |
| ocStbHostMpeg2ContentSelectedAudioPID | M | RO |
| ocStbHostMpeg2ContentOtherAudioPIDs | M | RO |
| ocStbHostMpeg2ContentCCIValue | M | RO |
| ocStbHostMpeg2ContentAPSValue | M | RO |
| ocStbHostMpeg2ContentCITStatus | M | RO |
| ocStbHostMpeg2ContentBroadcastFlagStatus | M | RO |
| ocStbHostMpeg2ContentEPNStatus | M | RO |
| | | |
| ocStbHostAnalogVideoTable | | |
| Object | OCHD2 | Access |
| ocStbHostAnalogVideoProtectionStatus | M | RO |
| | | |
| ocStbHostProgramStatusTable | | |
| Object | OCHD2 | Access |
| ocStbHostSPDIfAudioFormat | M | RO |
| ocStbHostSPDIfAudioMuteStatus | M | RO |
| | | |
| ocStbHostEasObjects | | |
| Object | OCHD2 | Access |
| ocStbEasMessageStateCode | M | RO |
| ocStbEasMessageCountyCode | M | RO |
| ocStbEasMessageCountySubdivisionCode | M | RO |

FIG. 4E

| ocStbHostDeviceSoftware | | |
|---|---|---|
| Object | OCHD2 | Access |
| ocStbHostSoftwareVersion | M | RO |
| ocStbHostSoftwareOCAPVersion | M | RO |
| | | |
| ocStbHostSoftwareDownloadStatus | | |
| Object | OCHD2 | Access |
| ocStbHostSoftwareImageStatus | M | RO |
| ocStbHostSoftwareCodeDownloadStatus | M | RO |
| ocStbHostSoftwareCodeObjectName | M | RO |
| | | |
| ocStbHostSecuritySubSystem | | |
| Object | OCHD2 | Access |
| ocStbHostSecurityIdentifier | M | RO |
| ocStbHostCASystemIdentifier | M | RO |
| ocStbHostCAType | M | RO |
| | | |
| ocStbHostPower | | |
| Object | OCHD2 | Access |
| ocStbHostPowerStatus | M | RO |
| ocStbHostAcOutletStatus | M | RO |
| | | |
| ocStbHostUserSettings | | |
| Object | OCHD2 | Access |
| ocStbHostUserSettingsPreferedLanguage | M | RO |
| | | |
| ocStbHostAcSwitch | | |
| Object | OCHD2 | Access |
| ocStbHostAcSwitchStatus | M | RO |

FIG. 6

| ocStbHostDVRStatus | | |
|---|---|---|
| Object | OCHD2 | Access |
| ocStbHostStorageType | M | RO |
| ocStbHostTotalStorageSize | M | RO |
| ocStbHostFreeStorageSize | M | RO |
| ocStbHostTotalTSBSize | M | RO |
| ocStbHostFreeTSBSize | M | RO |
| ocStbHostMarkedCCTValue | M | RO |
| ocStbHostPerformingStatus | M | RO |
| ocStbHostStorageCiperAlgorithm | M | RO |
| ocStbHostTBSCiperAlgorithm | M | RO |

HOST DEVICE INTERFACING WITH A POINT OF DEPLOYMENT (POD) AND A METHOD OF PROCESSING DIGITAL VIDEO RECORDER (DVR) STATUS INFORMATION

This application claims the benefit of Korean Patent Application No. 10-2007-95716, filed on Sep. 20, 2007 which is hereby incorporated by reference as if fully set forth herein.

BACKGROUND OF THE INVENTION

1. Field of the Invention

The present invention relates to a host device and a method of processing digital video recorder status information.

2. Discussion of the Related Art

As a data broadcast has appeared, a broadcast system which transmits and receives a broadcast has been changed to an interactive broadcast system. The interactive broadcast system includes the concept that a viewer or a broadcast receiving apparatus can transmit information associated with a broadcast, which will be received, to a broadcast transmitter.

FIG. 1 is a conceptual diagram showing a cable broadcast system including a broadcast host and a cable card as an example of the interactive broadcast system. A cable headend 10 or a plant 10 may receive a broadcast signal from a television broadcast station 20 via various communication networks. The cable headend 10 indicates a broadcast transmitting terminal including a broadcast system connected via a cable. The cable headend 10 may transmit a cable broadcast received via networks including nodes to host devices 31, 32, 33 and 34 of cable broadcast receiving apparatuses. The host devices 31, 32, 33 and 34 or cable cards included in the cable broadcast receiving apparatuses may receive and transmit signals from the cable headend 10 via cable networks.

The host devices 31, 32, 33 and 34 may be connected to other peripherals (e.g., a digital television receiver, a DVD player, a digital camcorder, a set top box and so on) via various interfaces.

As broadcasting contents become digitalized, the protection of the broadcasting contents may become more important. In order to protect the digital broadcast contents, the broadcast receiving apparatus can conditionally access broadcast contents such that an authorized user can view the broadcast contents. For example, the cable broadcast receiving apparatus uses an open cable scheme for separating a Point Of Deployment (POD) module including a Conditional Access (CA) system from a main body. For example, the POD module can be detachably connected to a slot of the main body of the broadcast receiving apparatus using a PCMCIA card. The POD module is called a cable card and the main body in which the cable card is inserted is called a host device. For example, a digital built-in television or a digital ready television corresponds to the host device. Hereinafter, the host device and the cable card are collectively called a cable broadcast receiving apparatus.

SUMMARY OF THE INVENTION

Accordingly, the present invention is directed to a host device interfacing with a Point Of Deployment (POD) and a method of processing digital video recorder (DVR) status information that substantially obviate one or more problems due to limitations and disadvantages of the related art.

An object of the present invention is to provide a host device interfacing with the POD for providing status information of a storage function of a broadcast receiver, and a method of processing DVR status information.

Another object of the present invention is to provide a host device interfacing with the POD for providing information on a method of ciphering contents received by a broadcast receiver, and a method of processing DVR status information.

Another object of the present invention is to provide a host device interfacing with the POD for monitoring status information of a storage function of a broadcast receiver, and a method of processing DVR status information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a host device interfacing with a point of deployment (POD) includes a storage device recording contents; a communication unit transmitting/receiving data over a network; and a controller collecting information associated with the storage of the contents, updating digital video recorder (DVR) status information on the basis of the collected information, and transmitting the updated DVR status information via the communication unit when a request for the DVR status information is received. The DVR status information may include at least one of information indicating the type of the storage device, information indicating a total storage size of the storage device, information indicating a free storage size of the storage device, information indicating a total size of a time shift buffer (TSB) allocated to the storage device, information indicating a free size of the TSB allocated to the storage device, copy control information (CCI) of the contents, information indicating a performing status of the storage device, and information indicating a cipher algorithm of the storage device.

The DVR status information may be defined by a management information base (MIB).

The controller may transmit the DVR status information on the basis of a simple network management protocol (SNMP).

The controller may include an information management unit collecting the information associated with the storage of the contents and updating the DVR status information on the basis of the collected information, and a SNMP agent receiving the request for the DVR status information via the communication unit and transmitting the DVR status information via the communication unit when the request for the DVR status information is received.

The host device may further include a tuner receiving broadcast data, a demodulator demodulating the received broadcast data, and a multiplexer multiplexing the demodulated broadcast data and outputting the demultiplexed data to the POD.

In another aspect of the present invention, a method of processing digital video recorder (DVR) status information includes transmitting a network management protocol (SNMP) message including a request for the DVR status information including information associated with the storage of contents; receiving the SNMP message including the request for the DVR status information by a host device and transmitting the DVR status information according to the received request; and receiving and processing the transmitted DVR status information. The DVR status information may include at least one of information indicating the type of a storage device, information indicating a total storage size of the storage device, information indicating a free storage size of the storage device, information indicating a total size of a time shift buffer (TSB) allocated to the storage device, information indicating a free size of the TSB allocated to the storage device, information indicating a performing status of the storage device, and information indicating a cipher algorithm of the storage device.

The DVR status information may include copy control information (CCI) of the contents, and the processing of the DVR status information may include checking whether or not the contents of the host device are protected on the basis of the CCI of the contents.

The DVR status information may be defined by a management information base (MIB).

In another aspect of the present invention, a method of processing digital video recorder (DVR) status information includes collecting information associated with the storage of contents; updating the DVR status information on the basis of the collected information; checking whether or not a request for the DVR status information is received; and transmitting the updated DVR status information when the request for the DVR status information is received. The DVR status information may include at least one of information indicating the type of the storage device, information indicating a total storage size of the storage device, information indicating a free storage size of the storage device, information indicating a total size of a time shift buffer (TSB) allocated to the storage device, information indicating a free size of the TSB allocated to the storage device, copy control information (CCI) of the contents, information indicating a performing status of the storage device, and information indicating a cipher algorithm of the storage device.

The DVR status information may be defined by a management information base (MIB).

The transmitting of the DVR status information may include transmitting the DVR status information on the basis of a simple network management protocol (SNMP).

It is to be understood that both the foregoing general description and the following detailed description of the present invention are exemplary and explanatory and are intended to provide further explanation of the invention as claimed.

According to a host device interfacing with a POD and a method of processing DVR status information of the present invention, it is possible to provide the status information associated with a storage function of a broadcast receiver and check whether or not unauthorized duplication and copy of contents is performed.

In addition, it is possible to provide information on a method of ciphering the contents of the broadcast receiver and check a content protection level of the broadcast receiver.

In addition, it is possible to monitor the status information associated with the storage function of the broadcast receiver in real time, prevent the unauthorized duplication and copy of the contents, check the content management status with certainty, and prevent the reduction of the profit of a content provider and a broadcast provider due to the unauthorized duplication and copy of the contents.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4A to 4E are views showing examples of a variety of status information which can be transmitted from a host device to a multi system operator (MSO) using the SNMP;

FIG. 6 is a view showing an exemplary embodiment of DVR status information in the form of a table;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

Hereinafter, a host device interfacing with a Point Of Deployment (POD) and a method of processing digital video recorder (DVR) status information will be described. In the following embodiment, a multi system operator (MSO) headend may monitor and control authentication information between a host device and the POD using a network management protocol. The host device may transmit the DVR status information which is the status information of the POD and the host device using the network management protocol. The MSO headend includes a cable broadcast station which transmits a cable broadcast, a broadcast transmitting terminal which transmits other broadcast data such as an IP broadcast, and a system operator (SO) headend. The SO indicates a general cable broadcast provider (that is, a local cable TV broadcast provider). The MSO headend may be called a MSO. The POD and the host device interfacing therewith are collectively called a broadcast receiving apparatus.

There are various network management protocols. However, in the following embodiment, for example, a simple network management protocol (SNMP) will be described in order to facilitate the description of the embodiment of the present invention. The SNMP is one of the network-related standards used for previously preventing the overload of network traffic and a failure which may occur on the network due to various causes, efficiently finding the causes of the occurred failure, and performing a restoring operation. The SNMP may be used for performing basic network management and remotely checking the statuses of various devices connected via the network in real time.

Figure 1:
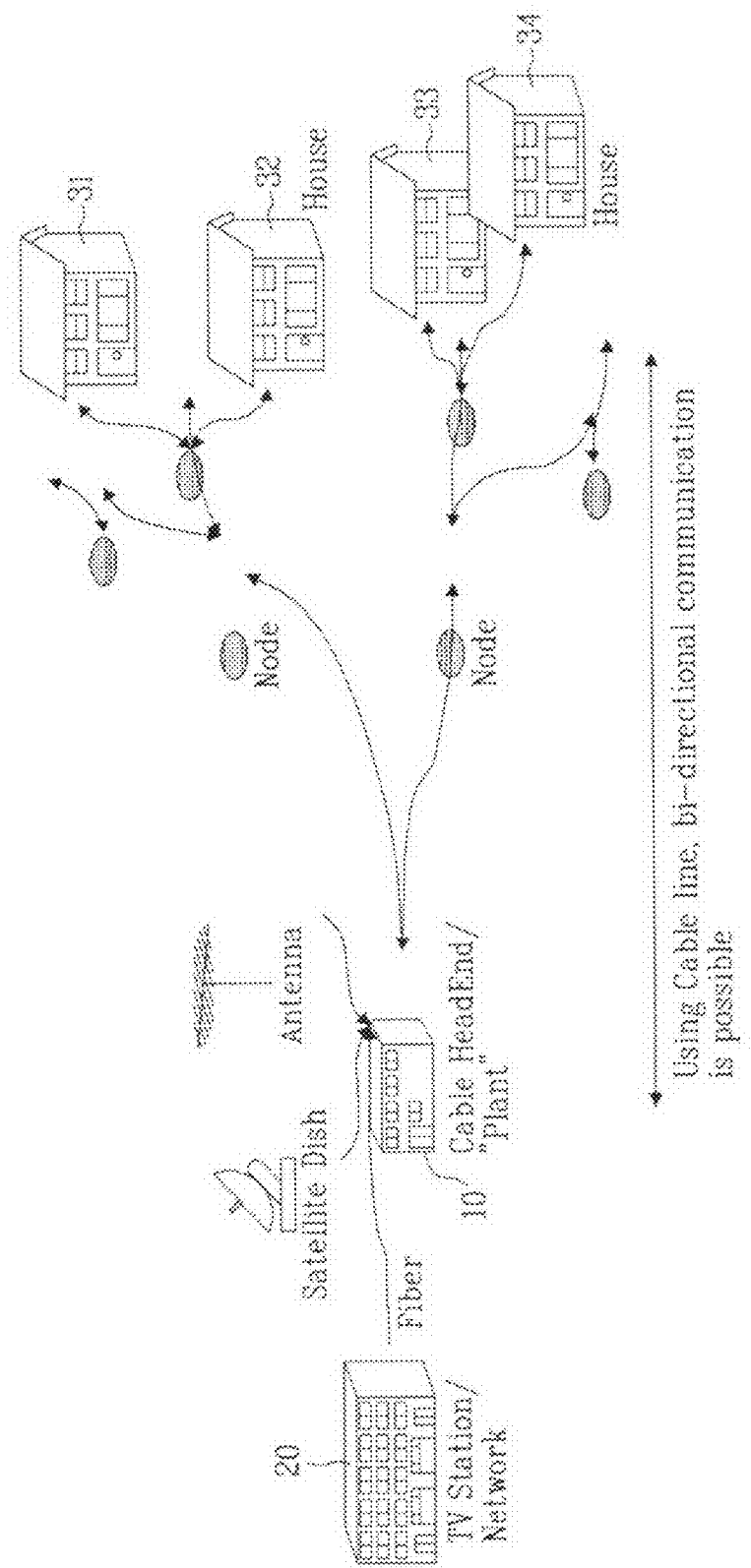
FIG. 1 is a conceptual diagram showing a cable broadcast network including a broadcast host device and a cable card.
Figure 2:
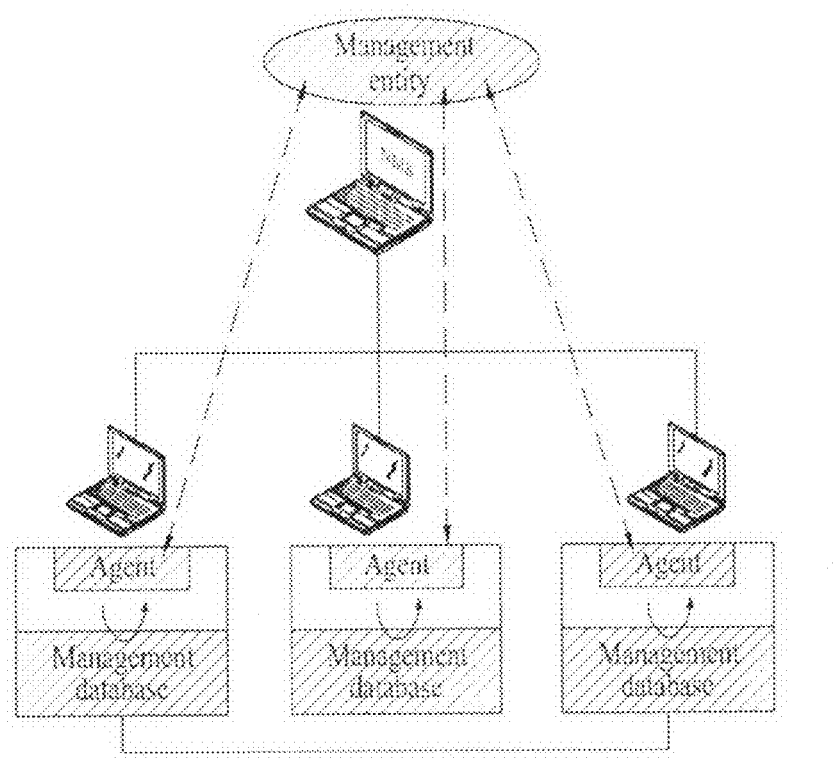
FIG. 2 is a view showing the configuration of a system in which a simple network management protocol (SNMP) management server and a SNMP agent are connected via a network.

FIG. 2 is a view showing the configuration of a system in which a SNMP management server and a SNMP agent are connected via a network.

Referring to FIG. 2, a network management system may transmit/receive management information to/from broadcast receiving apparatuses according to the network management protocol. The network management protocol may be the SNMP. The host device of each of the broadcast receiving apparatuses includes an agent. The agent collects the information associated with the agent of the broadcast receiving apparatus and transmits the collected information to the network management protocol via the network. The network management system for managing a management entity may be a broadcast transmitting terminal for transmitting contents, that is, a MSO. The network management system may receive the collected information from the broadcast receiving apparatuses and transmit a specific command to the broadcast receiving apparatus on the basis of the information. Hereinafter, a process of, at the MSO, obtaining the status information associated with the authentication of the POD and the broadcast receiving apparatus will be described.

Figure 3:
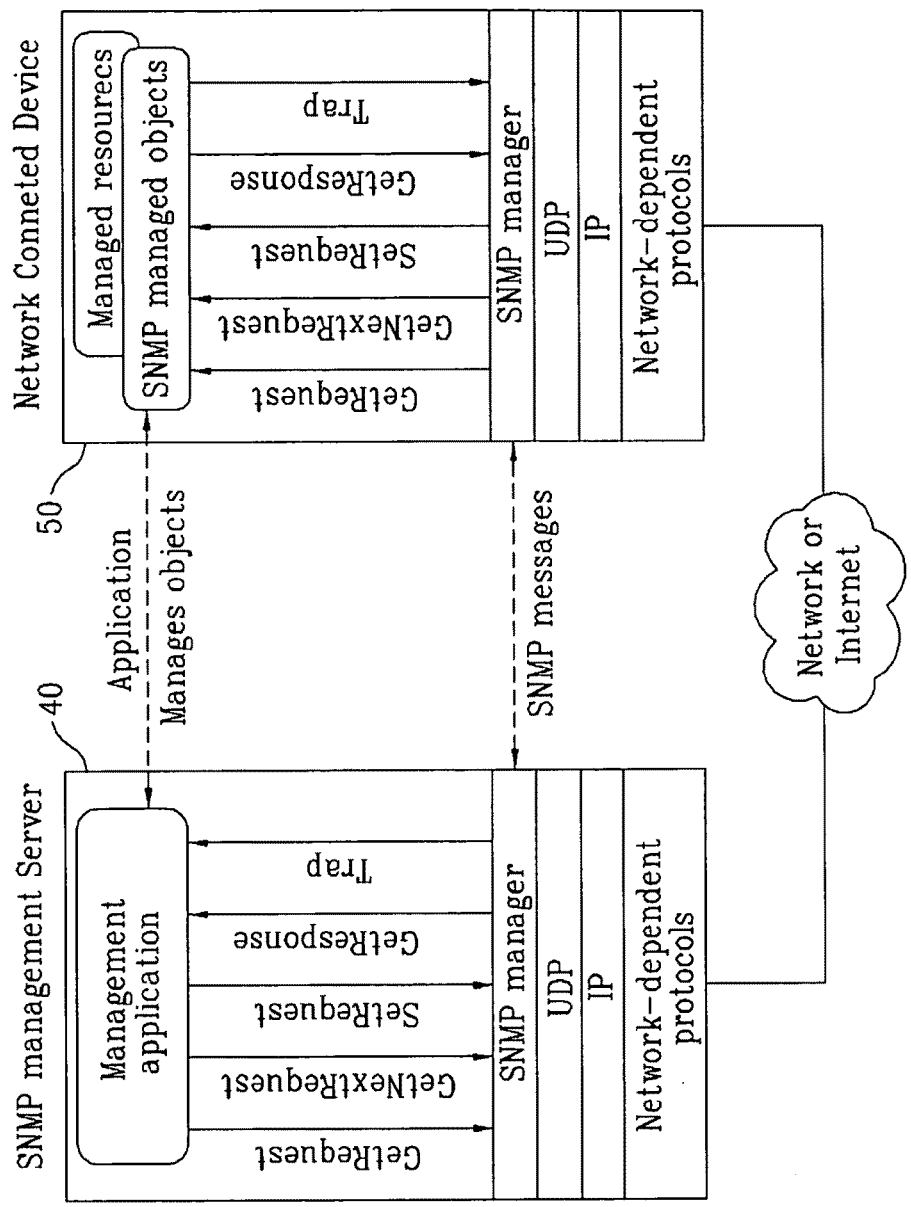
FIG. 3 is a conceptual diagram showing the transmission/reception of status information of a broadcast receiving apparatus using the SNMP.

FIG. 3 is a conceptual diagram showing the transmission/reception of status information of a broadcast receiving apparatus using the SNMP.

Referring to FIG. 3, the SNMP can be used in all types of network environments using a transmission control protocol/Internet protocol (TCP/IP). A SNMP management server 40 may be connected to a network connected device 50 via a wired/wireless network. In FIG. 3, the SNMP management server 40 may be a broadcast transmitting terminal for transmitting a broadcast, that is, a MSO, and the network connected device may be a POD or a host device including a SNMP agent. Hereinafter, it is assumed that the network connected device is the broadcast receiving apparatus 50 which includes both the host device and the POD.

The SNMP management server 40 may request the status information of the broadcast receiving apparatus 50 using the SNMP manager and acquire the status information. At this time, a communication form such as "get" or "set" may be used in the request of the status information or the response of the status information. The detailed description of the communication form will be described in detail with reference to FIG. 5. The SNMP management server 40 changes the information transmitted/received between the SNMP managers by a protocol such as a user datagram protocol (UDP), a transmission control protocol (TCP) or an Internet protocol (IP) and transmits the information via network dependent protocols of a physical layer.

The broadcast receiving apparatus 50 may receive the request for the status information and transmit the status information according to a predetermined form. The network connected device 50 which transmits the status information to the SNMP management server 40 may transmit the status information by a standardized data structure called a management information base (MIB).

The broadcast receiving apparatus 50 may include a SNMP agent in order to transmit a variety of status information represented by the data structure to the remote SNMP management server 40. The SNMP agent collectively calls devices or applications which can interface the MIB data with a network protocol such as the UDP/IP. Although this embodiment is applicable to a bi-directional broadcast system, for example, a cable broadcast system will be described in order to facilitate the description of the embodiment.

FIGS. 4A to 4E are views showing examples of a variety of status information which can be transmitted from a host device to a MSO using the SNMP.

Referring to FIGS. 4A to 4E, the status information of the broadcast receiving apparatus 50 can be transmitted by the MIB data structure. FIGS. 4A to 4E show the information which can be defined by the MIB data, which is divided and shown in the drawings, for convenience of description. In the example of FIG. 4A, ocstbHostHWIdentifiers indicates the information on the identifier of the host device and ocstbHostAVInterfaceTable indicates interface information of the host device. In FIG. 4A, ocstbHostIEEE1394Table indicates information on the connection status when the host device is connected by the IEEE 1394 standard. In FIG. 4B, ocstbHostIEEE1394ConnectedDevicesTable indicates information on the device connected by the IEEE 1394 standard and ocstbHostDVIHDMITable includes the status information when the host device receives an input according to digital video interactive (DVI) or high definition multimedia interface (HDMI).

In FIG. 4C, ocstbHostRFChannelOutTable indicates information indicating whether the host device can output a RF signal, ocstbHostInBandTunerTable indicates information on a RF channel frequency of the tuner of the host device, and ocstbHostProgramStatusTable indicates information on input/output of a broadcast stream which is currently received. The object identifiers of FIGS. 4D and 4E may be examples of the status information related to the broadcast receiving apparatus and may be defined by the MIB data structure. In FIGS. 4A to 4E, M stands for mandatory and indicates a matter which is mandatorily defined in the standard related to the MIB data of the cable broadcast. RO indicates that the MSO has a right (read-only) which can read the status information of the broadcast receiving apparatus. N-Acc (not accessible) indicates that the MSO cannot access the status information.

The cable broadcast receiving apparatus may define the MIB data structure and transmit the above-described information to the MSO by a SNMP method. From the viewpoint of the description of the MIB data structure, the MSO serves as the SNMP management server and the host device of the broadcast receiving apparatus serves as the SNMP agent.

Figure 5A:
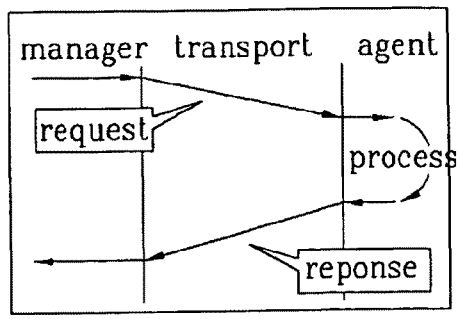
FIGS. 5A to 5C are conceptual diagrams of communication defined in the SNMP method.
Figure 5B:
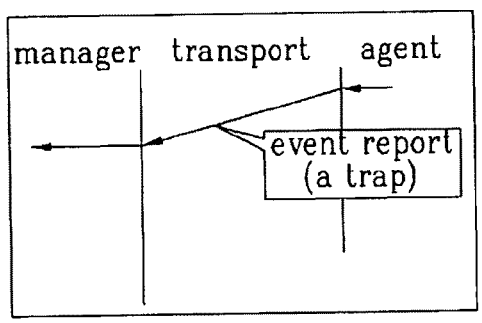
Figure 5C:
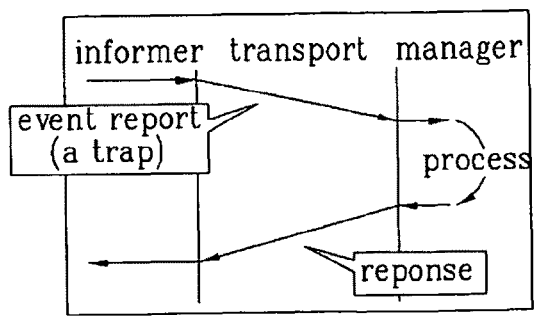

FIGS. 5A to 5C are conceptual diagrams of communication defined in the SNMP method.

Referring to FIGS. 5A to 5C, the concept that the SNMP management server and the SNMP agent exchange various object with each other may be classified to three concepts. FIG. 5A shows a first concept that the management server receives information from the agent. The management server may get the status information of the device via the agent (get operation) and set a specific value of the status information (set operation). If the management server requests specific information, the agent may determine whether the object is managed by the agent and respond thereto.

FIG. 5B shows a second concept that the management server communicates with the agent. When any event is generated in a device, the agent may report the status information of the event (trap operation). The management server may receive the status information of the event such that an adequate process is performed by the device which transmits the received status information.

The SNMP defines an informer, which is another object, in addition to the management server. FIG. 5C shows a third concept that the informer and the management server communicates with each other. The informer may report any event to the management server and the management server may transmit a response related to the event.

According to the above-described communication method according to the SNMP, if the host device includes the SNMP agent and defines the MIB data structure, the status information which is desired to be transmitted by the host device may be transmitted at a time point required by the management server. If a problem occurs in authentication information transmitted/received between the host device and the POD included in the broadcast receiving apparatus, the SNMP management server may receive the authentication information from the SNMP agent.

Hereinafter, a broadcast receiving apparatus which includes a DVR function and records and reproduces contents will be described. The DVR indicates all apparatuses which can record and reproduce digital contents. The DVR function may be restricted in view of the protection of the contents. If a content provider wants to protect its own contents, a content transmitting terminal for transmitting the contents (e.g., the cable headend) can provide copy control information (CCI) of the contents according to the content level. The detailed description of the CCI will be described in later.

FIG. 6 is a view showing an exemplary embodiment of DVR status information in the form of a table.

Referring to FIG. 6, when the MSO requests the DVR status information of the host device according to the network management protocol, the host device may collect the requested DVR status information and respond to the request. The DVR status information may include information associated with the storage of the contents, the status information of the DVR function and the status information of the function of a storage device for recording the contents received from the MSO. The DVR status information may be called ocstbHostDVRStatus, which may be modified.

The detailed items included in the DVR status information may be defined by the MIB objects in the broadcast receiving apparatus. Now, the objects will be described.

ocstbHostStorageType indicates whether the storage device for performing the DVR function is an internal device or an external device of the broadcast receiving apparatus. The storage device may be a volatile storage device or a non-volatile storage device, or at least one physical storage device may function as one logical storage device. A time shift buffer (TSB) may be allocated to the volatile storage device or the non-volatile storage device. If the TSB is allocated to the non-volatile storage device, it may be considered as a logical non-volatile storage device.

ocstbHostTotalStorageSize indicates the total storage size of the storage device for performing the DVR function. ocstbHostTotalStorageSize may restrictively indicate the total size of the non-volatile storage device for performing the DVR function.

ocstbHostFreeStorageSize indicates the free storage size of the storage device for performing the DVR function. ocstbHostFreeStorageSize may restrictively indicate the free size of the non-volatile storage device.

ocstbHostTotalTSBSize indicates the total size of the TSB. The TSB may be allocated to the volatile storage device or the non-volatile storage device. If the TSB is allocated to the non-volatile storage device, the host device processes the contents recorded in the TSB to be deleted when power is turned off later.

ocstbHostFreeTSBSize indicates the free storage size of the TSB.

ocstbHostMarkedCCIValue indicates the CCI of the contents recorded in the non-volatile storage device or the volatile storage device for performing the DVR function.

The CCI may include first CCI indicating that the contents received from the MSO can be permanently recorded in the storage device without ciphering, second CCI indicating that the contents cannot be permanently recorded in the storage device or the contents can be ciphered and cannot be recorded for a predetermined period of time or more, third CCI indicating that the CCI of the contents can be converted into the second CCI and permanently recorded when the contents are recorded, and fourth CCI indicating that the contents recorded in the storage device cannot be copied.

Now, an example of the CCI of the contents will be described. First, it is assumed that the first CCI (copy freely) indicates that the contents can be permanently recorded in the storage device without ciphering. For example, if the contents having the first CCI (copy freely) are recorded in the storage device and the storage device is the TSB, the contents can be continuously recorded while the power is maintained. If the storage device for recording the contents is a non-volatile storage device, the contents recorded in the storage device can be permanently recorded. Accordingly, the contents having the first CCI can be freely copied or recorded by a content receiver.

The second CCI (copy no more) indicates that the contents cannot be permanently recorded in the non-volatile storage device or the contents can be ciphered and cannot be recorded for a predetermined period of time or more, for example, 90 minutes or more.

The third CCI (copy one generation) indicates that the CCI of the contents can be converted into the second CCI (copy no more) and permanently recorded in the TSB which is the volatile storage device or the non-volatile storage device, when the contents are received and recorded. This information indicates that the contents are ciphered by an algorithm authorized with respect to the contents and recorded in the TSB which is the volatile storage device or the non-volatile storage device.

The fourth CCI (copy never) indicates that the contents recorded in the storage device cannot be copied.

In the above example, ocstbHostMarkedCCIValue is the status information for representing the value of the CCI of the recorded contents by any value. For example, ocstbHostMarkedCCIValue may be 1, 2, 3 or 4. 1 indicates the status information representing the first CCI (copy freely), 2 indicates the status information representing the second CCI (copy no more), 3 indicates the status information representing the third CCI (copy one generation), and 4 indicates the status information representing the fourth CCI (copy never).

ocstbHostPerformingStatus indicates the performing status of the storage device. For example, ocstbHostPerformingStatus may represent any one of information (Recording) indicating that the digital contents are recorded in the storage device, information (Play) indicating that the recorded contents are read and output from the storage device, information (Forward) indicating the performing status for finding data recorded later than the contents which are currently output from the storage device, information (Rewind) indicating the performing status for finding data recorded earlier than the contents which are currently output, and information (Stop) indicating that the operation of the storage device is stopped.

ocstbHostStorageCipherAlgorithm indicates the algorithm used for ciphering the contents input to the non-volatile storage device.

ocstbHostTSBCipherAlgorithm indicates the algorithm used for ciphering the contents input to the TSB which is the volatile storage device.

The host device collects the information which will be set to the MIB objects and updates the values of the MIB objects on the basis of the collected information. When the host device transmits the updated values of the MIB objects to the MSO via the network via the network management protocol, the MSO can obtain the status information of the DVR function of the storage device of the broadcast receiving apparatus from the received information.

Figure 7:
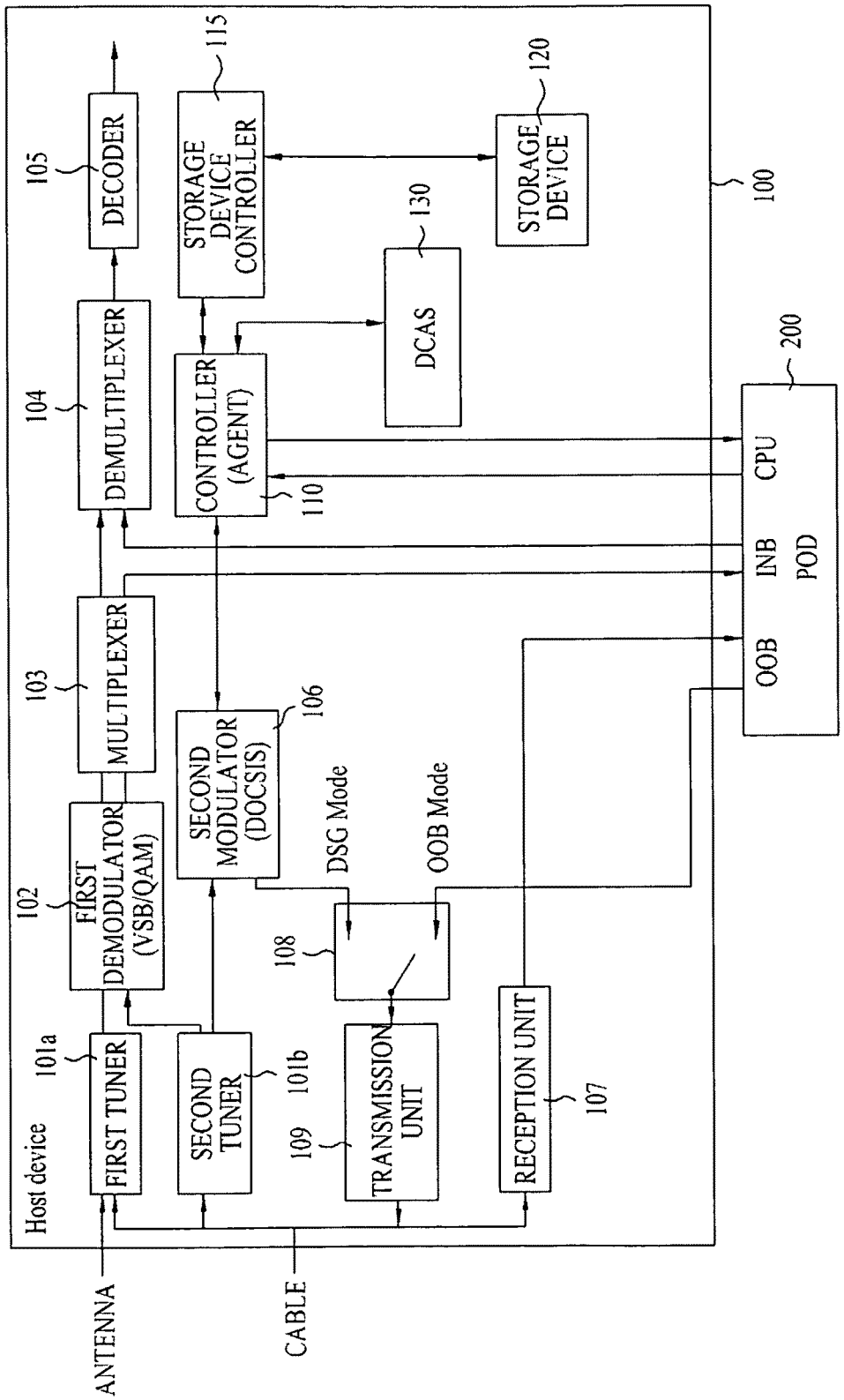
FIG. 7 is a view showing the configuration of a broadcast receiving apparatus according to an exemplary embodiment of the present invention.

FIG. 7 is a view showing the configuration of a broadcast receiving apparatus according to an exemplary embodiment of the present invention. The cable broadcast receiving apparatus according to the embodiment of the present invention will now be described with reference to FIG. 7.

If the broadcast receiving apparatus of the embodiment of the present invention is the cable broadcast receiving apparatus, the broadcast receiving apparatus may include a host device 100 and a POD 200 which is detachably mounted in the host device.

The host device may receive only a cable broadcast signal or at least one of a cable broadcast, a terrestrial broadcast or a satellite broadcast. That is, in the present embodiment, it is assumed that the host device 100 can receive at least one of the cable broadcast, the terrestrial broadcast or the satellite broadcast.

In FIG. 7, the cable broadcast receiving apparatus which can realize an out of band (OOB) mode and a data over cable service interface specifications (DOCSIS) settop gateway (DSG) mode as a bidirectional communication method between the cable broadcast receiving apparatus and the MSO is shown. The host device can receive a broadcast or transmit information to the broadcast transmitting terminal by the above-described method.

The OOB mode is the transmission standard between the MSO and the settop box. In contrast, the DSG indicates the transmission method between a cable model control system of a cable broadcast station and a DOCSIS-based cable modem in the cable broadcast receiving apparatus.

The DOCSIS is the digital cable television standard employed by Cablelabs, which is the US-based cable broadcast standardization and certification institute. According to this standard, data can be transmitted using a cable modem.

Although the cable broadcast receiving apparatus using a combination of the OOB mode and the DSG mode is described in the embodiment of FIG. 7, this is only an exemplary embodiment of the present invention.

In the embodiment of FIG. 7, the host device 100 may include a first tuner 101a, a second tuner 101b, a first demodulator 102, a multiplexer 103, a demultiplexer 104, a decoder 105, a second demodulator 106, a reception unit 107, a switch 108, a transmission unit 109, a controller 110, a storage device controller 115, and a storage device 120.

The first tuner 101a may tune to a specific channel frequency of a terrestrial audio/video (A/V) broadcast transmitted via an antenna or a cable A/V broadcast transmitted inband via a cable and output the tuned signal to the first demodulator 102.

The terrestrial broadcast and the cable broadcast may be different from each other in the transmission method. The first demodulator 102 may perform different demodulating processes with respect to signals which are modulated by different modulating methods. In FIG. 7, if the terrestrial A/V broadcast is modulated by a vestigial sideband modulation (VSB) method and the cable A/V broadcast is modulated by a quadrature amplitude modulation (QAM) method, the first demodulator 102 demodulates the signal selected by the first tuner 101a by the VSB method or the QAM method.

The signals demodulated by the first demodulator 102 may be multiplexed by the multiplexer 103. The multiplexer 103 may output the cable broadcast to the POD 200 and output the terrestrial broadcast to the demultiplexer 104.

In the embodiment of FIG. 7, the POD 200 can process multiple streams. Accordingly, the POD 200 may enable the host device 100 to output the broadcast in which at least two streams are multiplexed.

The demultiplexer 104 receives the multiplexed broadcast signal, separates the broadcast signal into multiple streams, and outputs the multiple streams. The decoder 105 may decode the received broadcast signal and output a video/audio signal which can be recognized by a user.

The second tuner 101b may tune to a specific channel frequency of a data broadcast transmitted via the cable by the DSG mode and output the tuned signal to the second demodulator 106. The second demodulator 106 may demodulate the data broadcast of the DSG mode and output the demodulated broadcast signal to the controller 110.

A communication unit of the host device which transmits/receives data to/from the MSO may be implemented by the reception unit 107 and the transmission unit 109. The reception unit 107 tunes to a specific channel frequency with respect to the broadcast signal transmitted in the OOB mode via the cable and outputs the tuned signal to the POD 200.

If the bidirectional communication between the cable broadcast station and the cable broadcast receiving apparatus is possible, uplink information (e.g., pay program application, DVR status information or the like) transmitted from the cable broadcast receiving apparatus to the cable broadcast station may be transmitted in the OOB mode or the DSG mode. Accordingly, the cable broadcast receiving apparatus according to the embodiment of the present invention may include the switch 108 in order to transmit the information by one of the modes.

The signal of the DSG mode is converted by the second demodulator 106 under the control of the controller 110 of the host device according to the network protocol, is selected by the switch 108, and is transmitted via the cable.

The signal of the OOB mode is sent to the transmission unit 109 via the cable card 200 and is transmitted by the transmission unit via the cable. In the OOB mode, user information, system diagnostic information and DVR status information shown in FIG. 6 are output to the transmission unit 109 via the POD 200 and the switch 108, and the transmission unit 109 modulates the output signal by a quadrature phase-shift keying (QPSK) modulation method and transmits the modulated signal to the cable broadcast station via the cable.

If the broadcast-related information of the user and the DVR status information are transmitted in the DSG mode, the information is output to the transmission unit 109 via the controller 110 and the switch 108, is modulated by the transmission unit 109 by a QAM-16 modulation method, and is transmitted to the cable broadcast station via the cable.

The storage device 120 may record the received broadcast contents or applications. The storage device 120 may be a volatile storage device or a non-volatile storage device, and at least one physical storage device may function as one logical storage device. The TSB may be allocated to the volatile storage device or the non-volatile storage device. If the TSB is allocated to the non-volatile storage device, it may be considered as a logical non-volatile storage device.

The storage device controller 115 may control the operation of the storage device 120. The storage device controller 115 may calculate a free size or an available size of the storage device 120. For example, the storage device controller 115 may calculate the size of the storage device 120 using any program function. In this case, if the storage device controller 115 calls the function, the function may return the value of the free size of the storage device 120. That is, the storage device controller 115 may calculate the total size and the available size of the TSB which is the volatile storage device if the storage device is the TSB and calculate the total size and the available size of the non-volatile storage device if the storage device is the non-volatile storage device. If the storage device is the non-volatile storage device, the storage device controller 115 can obtain the performing status of the non-volatile storage device. For example, the storage device controller 115 may obtain information on the performing status such as Recording, Play, Rewind, Forward and Stop. The storage device controller 115 may transmit the information on the storage device 120 to the controller 110.

The controller 110 may define the DVR status information by the MIB data. For example, the controller 110 may obtain the object of the DVR status information defined by the MIB. The controller 110 converts the information corresponding to the obtained object by the network management protocol and outputs the converted information to the MSO. The host device may convert the information defined by the MIB data by the SNMP method and output the converted information in order to transmit the information to the MSO.

At this time, the SNMP agent may be implemented by separate devices (not shown) and the controller 110 may function as the SNMP agent. That is, the controller may include the SNMP agent and an information management unit (not shown). The information management unit (not shown) collects information associated with the storage of the contents and information on the storage device 120 and updates the DVR status information on the basis of the collected information. If the DVR status information is defined in the form of the table shown in FIG. 6, the information management unit (not shown) may collect the values of the MIB objects included in the table, update the values of the MIB objects included in the table on the basis of the collected values, and update the DVR status information.

The SNMP agent may receive the request for the DVR status information via the reception unit 107 and control the DVR status information updated by the information management unit (not shown) to be transmitted via the transmission unit 109 when the request for the DVR status information is received. At this time, the SNMP agent may packetize object identifier data defined by the MIB data which is the DVR status information, convert the packetized object identifier data to the UDP/IP packets and output the UPD/IP packets. The MSO may request the DVR status information by requesting the value of the object identifier defined by the MIB.

A downloadable conditional access system (DCAS) 130 may receive and operate a cipher algorithm when the MSO transmits the cipher algorithm. Accordingly, if the DCAS 130 is included in the host device 100, the host device can receive the cable broadcast without the POD 200.

In the embodiment of FIG. 7, the POD 200 may receive the multi-stream broadcast signal from the multiplexer 103 if the received broadcast is the terrestrial broadcast and descramble the broadcast so as to normally reproduce or record the cable broadcast if the broadcast signal is scrambled.

Figure 8:
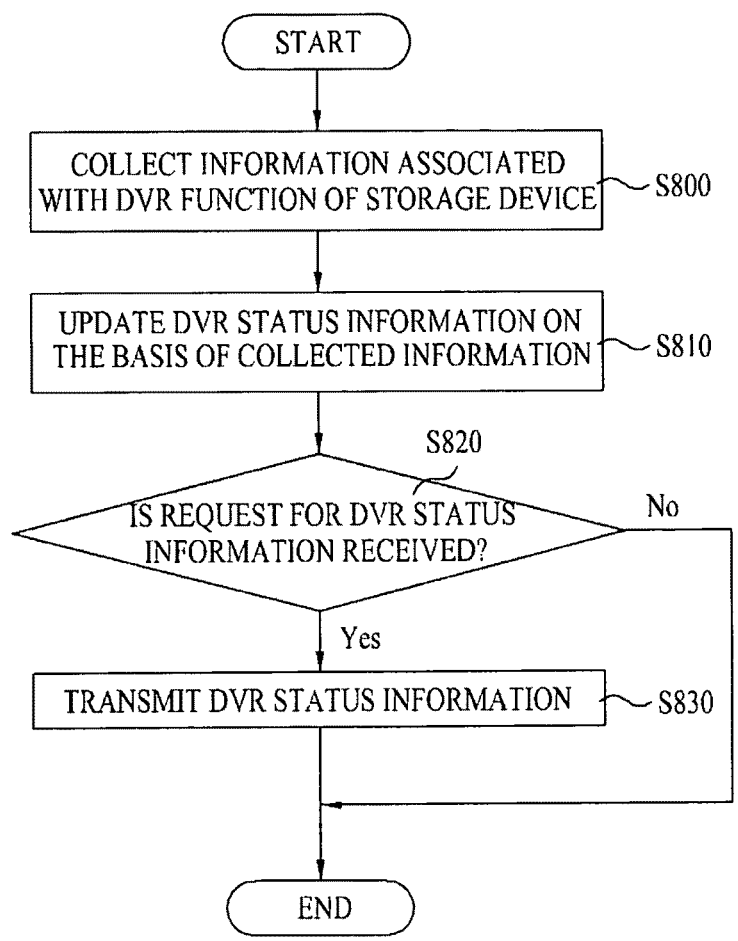
FIG. 8 is a flowchart illustrating a method of processing DVR status information according to an exemplary embodiment of the present invention.

FIG. 8 is a flowchart illustrating a method of processing DVR status information according to an exemplary embodiment of the present invention.

Referring to FIG. 8, the controller 110 collects the information on the digital content storage function (DVR function) of the storage device included in the broadcast receiving apparatus (S800). The controller 110 updates the DVR status information on the basis of the collected information (S810). The DVR status information may be defined in the unit of MIB objects and may have table values as shown in FIG. 6. The DVR status information may include at least one of the information indicating the type of the storage device, the information indicating the total storage size of the storage device, the information indicating the free storage size of the storage device, the information indicating the CCI of the contents, the information indicating the performing status of the storage device and the information indicating the cipher algorithm of the storage device. If the DVR status information is defined in the unit of MIB objects, the controller 110 may collect the information in the unit of MIB objects in the step S800.

The controller 110 may perform the step S800 and the step S810 by the request of the MSO or repeatedly perform the step S800 and the step S810 in a predetermined period. Accordingly, the host device according to the present invention may provide newest DVR status information to the MSO in real time.

The controller 110 checks whether or not the request for the DVR status information is received (S820). The controller 110 transmits the updated DVR status information to the MSO when the request for the DVR status information is received (S830). The controller 110 may convert the collected DVR status information into the form indicated by the network management protocol and transmit the converted information. As the network management protocol, the SNMP may be used. That is, the controller 110 may transmit the DVR status information to the MSO on the basis of the SNMP.

Figure 9:
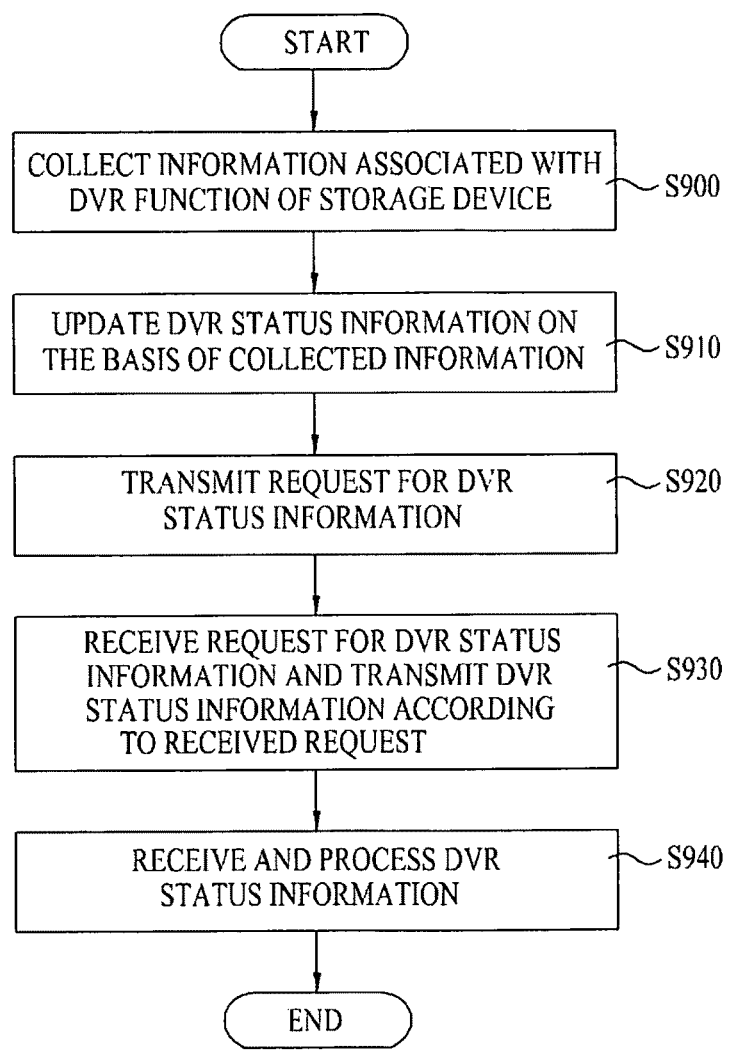
FIG. 9 is a flowchart illustrating a method of processing DVR status information according to another exemplary embodiment of the present invention.

FIG. 9 is a flowchart illustrating a method of processing DVR status information according to another exemplary embodiment of the present invention.

Referring to FIG. 9, the host device collects information associated with the digital content storage function (DVR function) of the storage device included in the broadcast receiving apparatus (S900). The host device may define the DVR status information in the unit of MIB objects and the DVR status information may have table values as shown in FIG. 6. The DVR status information may include at least one of the information indicating the type of the storage device, the information indicating the total storage size of the storage device, the information indicating the free storage size of the storage device, the information indicating the total size of the TSB allocated to the storage device, the information indicating the free size of the TSB allocated to the storage device, the CCI of the contents, the information indicating the performing status of the storage device and the information indicating the cipher algorithm of the storage device. If the DVR status information is defined in the unit of MIB objects, the host device may collect the information in the unit of MIB objects.

The host device updates the DVR status information on the basis of the collected information (S910). The host device may perform the step S900 and the step S910 by the request of the MSO or repeatedly perform the step S900 and the step S910 in a predetermined period. Accordingly, the host device according to the present invention may provide newest DVR status information to the MSO in real time.

The MSO transmits the request for the DVR status information to the host device (S920). The MSO may request the DVR status information by the network management protocol. As an example of the network management protocol, the SNMP may be used. That is, the MSO may transmit the request for the DVR status information on the basis of the SNMP.

The host device receives the request for the DVR status information transmitted by the MSO and transmits the DVR status information according to the received request (S930). The host device may convert the DVR status information into the form indicated by the network management protocol and transmits the converted information according to the network management protocol.

The MSO receives and processes the DVR status information transmitted by the host device (S940). The MSO may monitor the information associated with the storage of the contents of the broadcast receiving apparatus on the basis of the received DVR status information. That is, the MSO monitors whether or not the broadcast receiving apparatus performs unauthorized duplication and copy of the contents on the basis of the received DVR status information. For example, the MSO may compare the copy control information set in the contents with the copy control information included in the DVR status information and check whether or not the broadcast receiving apparatus records the contents according to the copy control information set in the contents.

The method of processing the status information of the storage device and the broadcast receiving apparatus according to the present invention are not limited to a cable broadcast system and is applicable to any bidirectional broadcast system.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A host device interfacing with a point of deployment (POD), the host device comprising:
a storage device configured to record contents received from a multi system operator (MSO);
a communication unit configured to transmit/receive data over a network; and
a controller configured to collect digital video recorder (DVR) status information associated with the storage of the contents from the MSO, and transmit the collected DVR status information via the communication unit to the MSO,
wherein the DVR status information includes first status information indicating copy control information (CCI) of the recorded content in the storage device, second status information indicating any one of a total size and a free size of a time-shift buffer (TSB) allocated to the storage device, third status information indicating a status of performing of the storage device, fourth status information indicating a type of the storage device, fifth status information indicating a total storage size of the storage device, sixth status information indicating a free storage size of the storage device, and seventh status information indicating a cipher algorithm of the storage device,
wherein the first status information includes first CCI indicating on whether or not the contents be permanently recorded in the storage device, second CCI indicating whether or not the contents do not be permanently recorded in the storage device, and whether or not the contents are ciphered and do not be recorded for a predetermined period of time or more, third CCI indicating whether or not the CCI of the contents is converted into the second CCI and permanently recorded when the contents are recorded, and fourth CCI indicating whether or not the content recorded in the storage device does not be further copied,
wherein the status of performing of the storage device includes any one of recording information indicating that the contents are recorded in the storage device, play information indicating that the recorded contents are read and output from the storage device, and operation information indicating that the operation of the storage device is operated any one of forward, rewind and stop, and
wherein the controller collects the DVR status information when a trap operation is enabled according to running a specific event at the host device.

2. The host device according to claim 1, wherein the controller controls to transmit the DVR status information defined by a management information base (MIB) on the basis of a simple network management protocol (SNMP) to the MSO.

3. The host device according to claim 2, wherein the controller includes:
an information management unit collecting the information associated with the storage of the contents and updating the DVR status information on the basis of the collected information; and
a SNMP agent receiving the request for the DVR status information via the communication unit and transmitting the DVR status information via the communication unit when the request for the DVR status information is received.

4. The host device according to claim 1, further comprising:
a tuner receiving broadcast data;
a demodulator demodulating the received broadcast data; and
a multiplexer multiplexing the demodulated broadcast data and outputting the demultiplexed data to the POD.

5. A method of processing digital video recorder (DVR) status information, the method comprising:
collecting the digital video recorder (DVR) status information associated with storing content from a simple network management protocol (SNMP) management server;
updating the DVR status information on the basis of the collected information by the controller; and
transmitting the updated DVR status information to the SNMP management server,
wherein the DVR status information includes first status information indicating copy control information (CCI) of the recorded content in the storage device, second status information indicating any one of a total size and a free size of a time-shift buffer (TSB) allocated to the storage device, third status information indicating a status of performing of the storage device, fourth status information indicating a type of the storage device, fifth status information indicating a total storage size of the storage device, sixth status information indicating a free storage size of the storage device, and seventh status information indicating a cipher algorithm of the storage device,
wherein the first status information includes first CCI indicating on whether or not the contents be permanently recorded in the storage device, second CCI indicating whether or not the contents do not be permanently recorded in the storage device, and whether or not the contents are ciphered and do not be recorded for a predetermined period of time or more, third CCI indicating whether or not the CCI of the contents is converted into the second CCI and permanently recorded when the contents are recorded, and fourth CCI indicating whether or not the content recorded in the storage device does not be further copied, wherein the status of performing of the storage device includes any one of recording information indicating that the contents are recorded in the storage device, play information indicating that the recorded contents are read and output from the storage device, and operation information indicating that the operation of the storage device is operated any one of forward, rewind and stop, and wherein the step of collecting the DVR status information is performed when a trap operation is enabled according to running a specific event at the host device.

6. The method according to claim 5, wherein the DVR status information defined by a management information base (MIB) is transmitted on the basis of a simple network management protocol (SNMP).

* * * * *